United States Patent [19]
Takami et al.

[11] 4,276,633
[45] Jun. 30, 1981

[54] SELF-LUMINESCENT LIGHT SOURCE FOR LIQUID CRYSTAL DISPLAY WATCH

[75] Inventors: Katsumi Takami, Tokyo; Takashi Matsuzawa, Musashino, both of Japan

[73] Assignee: Hitachi, Ltd., Tokyo, Japan

[21] Appl. No.: 29,012

[22] Filed: Apr. 11, 1979

[30] Foreign Application Priority Data

Apr. 12, 1978 [JP] Japan ................................ 53/42100

[51] Int. Cl.$^3$ ..................... G04G 9/12; G04B 19/30; G04C 17/00; G02F 1/13
[52] U.S. Cl. ................................. 368/227; 368/242; 250/463; 313/54; 350/345; 362/159
[58] Field of Search ............. 58/50 R, 50 A; 250/462, 250/467, 487; 362/23, 159; 313/54, 113, 313; 350/338, 335, 345; 368/84, 227, 242

[56] References Cited

U.S. PATENT DOCUMENTS

| | | | |
|---|---|---|---|
| 3,043,710 | 7/1962 | Patten et al. | 250/487 X |
| 3,409,770 | 11/1968 | Clapham, Jr. | 250/462 |
| 3,478,209 | 11/1969 | Feller | 250/462 X |
| 3,950,078 | 4/1976 | Zatsky | 58/50 R X |
| 4,126,383 | 11/1978 | Doriguzzi et al. | 350/345 |
| 4,126,384 | 11/1978 | Goodman et al. | 250/467 X |

Primary Examiner—Edith S. Jackmon
Attorney, Agent, or Firm—Craig & Antonelli

[57] ABSTRACT

A self-luminescent light source for a liquid crystal display watch characterized by comprising a fluorescent substance layer which has a light reflectivity and which contains a radioactive substance in at least a part thereof, a reflective layer which is disposed on one surface of the fluorescent substance layer and which serves to reflect and scatter fluorescence from the fluorescent substance layer, a case which is disposed on the side of the reflective layer remote from the fluorescent substance layer and which serves to perform shielding from radiation given out from the radioactive substance, and a cover which is disposed on the side of the fluorescent substance layer remote from the reflective layer and which serves to absorb the radiation given out from the radioactive substance and to transmit the light from the fluorescent substance layer.

9 Claims, 5 Drawing Figures

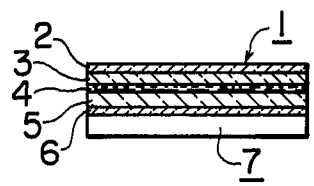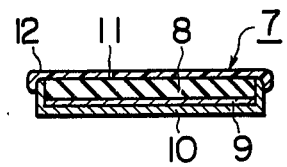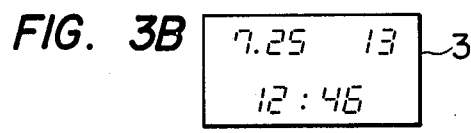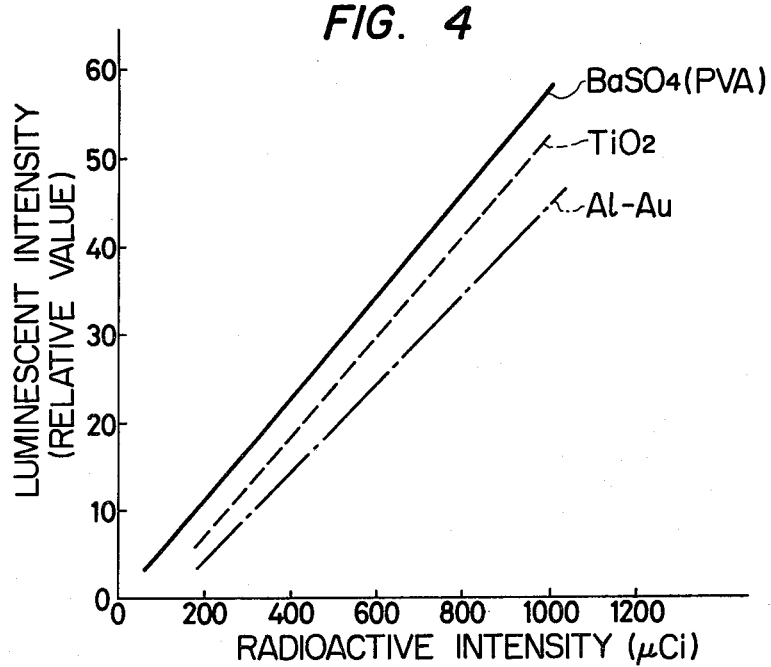

and the patent number 4,276,633

SELF-LUMINESCENT LIGHT SOURCE FOR LIQUID CRYSTAL DISPLAY WATCH

BACKGROUND OF THE INVENTION

1. Field of the Invention

This invention relates to a self-luminescent light source which makes the night display of a liquid crystal display watch.

2. Description of the Prior Art

A liquid crystal display watch displays letters and numerals by reflecting external light. Accordingly, the display is impossible in a dark place or in the nighttime. In order to overcome the drawback, the night display has heretofore been effected by inserting at the back of a liquid crystal display element a tubular self-luminescent light source whose inner wall is coated with a fluorescent material and in which high-pressure tritium gas ($^3$H) is contained. However, in order to obtain a light source which is bright enough to recognize the numerals of a liquid crystal with the eyes, its radioactive intensity must be on the order of 100 mC$_i$, which is not always desirable from the aspect of safety.

SUMMARY OF THE INVENTION

In order to eliminate the disadvantage of the prior art as stated above, this invention has for its object to provide a self-luminescent light source for a liquid crystal display watch which uses the smallest possible quantity of radioactivity and which has means for enhancing the utilization factor of fluorescence to the utmost.

To accomplishment of the above object, a self-luminescent light source for a liquid crystal display watch according to this invention is characterized by comprising a fluorescent substance layer which has a light reflectivity and which contains a radioactive substance in at least a part thereof, a reflective layer which is disposed on one surface of said fluorescent substance layer and which serves to reflect and scatter fluorescence from said fluorescent substance layer, a case which is disposed on the side of said reflective layer remote from said fluorescent substance layer and which serves to perform shielding from radiation given out from said radioactive substance, and a cover which is disposed on the side of said fluorescent substance layer remote from said reflective layer and which serves to absorb the radiation given out from said radioactive substance and to transmit the light from said fluorescent substance layer.

BRIEF DESCRIPTION OF THE DRAWING

FIG. 1 is a sectional view showing the whole construction of a display element for a liquid crystal display watch which employs a self-luminescent light source according to this invention, FIG. 2 is a sectional view showing a concrete construction of the self-luminescent light source (7) in FIG. 1, FIG. 3A is a plan view showing a fluorescent substance layer in FIG. 2, while FIG. 3B is a plan view of an upper glass plate in FIG. 1 as juxtaposed for explaining the corresponding relation with the fluorescent substance layer shown in FIG. 3A, and FIG. 4 is a graph showing differences in the luminescent intensity of the self-luminescent light source as are dependent upon reflective materials.

DESCRIPTION OF THE PREFERRED EMBODIMENTS

FIG. 1 shows a section of a display element for a liquid crystal display watch which is constructed by employing a self-luminescent light source according to this invention. Referring to the figure, numeral 1 designates the whole display element for a liquid crystal display watch, numeral 2 an upper polarization plate, and numeral 3 an upper glass plate which is vapor-coated with transparent conductive electrodes corresponding to numerals. Numeral 4 designates a nematic liquid crystal material, and numeral 5 a lower glass plate which is provided with transparent conductive electrodes corresponding to those of the upper glass plate 3. Numeral 6 indicates a lower polarization plate. The upper polarization plate 2 and the lower polarization plate 6 are arranged so that their polarizations may intersect orthogonally. Shown at 7 is the self-luminescent light source according to this invention, the detailed view of which is given in FIG. 2. Referring to FIG. 2, numeral 8 denotes a light accumulating type fluorescent substance (for example, ZnS:ZnO) or a general fluorescent substance (for example, ZnS:Cu), numeral 9 a reflective film of barium sulfate (BaSO$_4$) employing polyvinyl alcohol (PVA) as a vehicle, and numeral 10 a metallic case made of Al or the like. Further, in this invention, there is disposed a self-luminescent type fluorescent substance 11 which consists of a fluorescent material (ZnS:Cu) having substantially the same color as that of the fluorescent substance 8 and a reflectivity equal to that of the fluorescent substance as illustrated in FIG. 3A and a radioactive substance. Recommended for a radiation source for self-luminescence (especially, beta-ray source) are solid tritium ($^3$H), promethium ($^{147}$Pm), nickel ($^{63}$Ni), radium ($^{226}$Ra), strontium:yttrium ($^{90}$Sr+$^{90}$Y), etc. As apparent from FIGS. 3A and 3B, the self-luminescent fluorescent substance 11 is disposed so as to occupy only a time indicating portion. Accordingly, all the indicating portions of "second", "date", "a. m.", "p. m." and "day of the week" (in FIG. 3B, "7.25" indicates the date, and "13" indicates the seconds) other than the time indicating portion (only "hour", or "hour and minute") are occupied by the fluorescent substance 8 which contains no radioactive substance. Further, a cover 12 in FIG. 2 is a transparent polymer film, which functions to absorb beta rays generated from the self-luminescent type fluorescent substance 11 and to transmit light from the fluorescent substances 8 and 11. The cover 12 may use glass instead of the transparent polymer film. In this case, lead-containing glass is desirable.

In this invention, the construction as above stated is adopted, whereby the following functional effects are achieved:

(i) Since BaSO$_4$ is employed as the reflector plate of the fluorescence ranging from the ultraviolet region to the visible region, an increase in the luminescent intensity by at least 10%–20% is achieved over other reflective materials. By the way, when cases of employing ordinary reflectors (vapor coating of Al, vapor coating of Au, and white dye of TiO$_2$) and the case of employing BaSO$_4$ are compared, differences appear distinctly as indicated in FIG. 4. Originally, the luminescent intensity is low. Even with the increase of the luminescent intensity by 10–20%, therefore, the display is sensed as if it became remarkably clear. As the reasons for the increase of the luminescent intensity owing to BaSO$_4$, there are mentioned (a) that BaSO₄ has a high reflection factor in a range from the near-ultraviolet to visible regions, (b) that since the fluorescence is not reflected by a mirror surface but is scattered and reflected by fine grain powder of BaSO₄, the fluorescent substance is further excited by the scattered light, so a synergetic effect manifests itself, (c) that the fluorescent material and a binder therefor change the quanlity of the surface of Al or the surface layer of TiO₂ and degrade the reflection factor, whereas BaSO₄ is very stable chemically and less prone to be affected by any other organic material, so it is held at the high reflection factor for a long time, etc.

(ii) In order to intensify the fluorescence, the whole radioactive substance is compounded in a manner to be especially concentrated on only the fluorescent substance of the important indicating portion ("hour, minute"). Therefore, the radioactive intensity and accordingly the luminescent intensity increase. The radioactive intensity is low as a whole, and this is advantageous from the aspect of safety. The special limitation of the intensified fluorescence to the indication of only "hour" or "hour, minute" is just grounded on the fact that information of date, second etc. are unnecessary while one is sleeping in the night.

(iii) Since the important indicating portion and the other indicating portions have the same color and equal reflectivities, the fluorescent substances 8 and 11 act only as a reflector perfectly in a bright place in the daytime, and such a deterioration of the display quality that the self-luminescent fluorescent substance part is conspicuously seen does not occur.

(iv) The radioactive substance employed is fully in the solid state. Therefore, in case of any damage, bad influences such as environmental pollution and contamination of the human body attributed to the ³H gas are little. Owing to the cover made of a metal, a high polymer or glass, all the beta rays are absorbed, and the safety is satisfactorily guaranteed.

We claim:

1. A self-luminescent light source for a liquid crystal display watch comprising a fluorescent substance layer which has a light reflectivity and which contains a radioactive substance in at least a part thereof, a reflective layer comprising barium sulfate which is disposed on one surface of said fluorescent substance layer and which serves to reflect and scatter fluorescence from said fluorescent substance layer, a case which is disposed on the side of said reflective layer remote from said fluorescent substance layer and which serves to perform shielding from radiation given out from said radioactive substance, and a cover which is disposed on the side of said fluorescent substance layer remote from said reflective layer and which serves to absorb the radiation given out from said radioactive substance and to transmit the light from said fluorescent substance layer.

2. A self-luminescent light source for a liquid crystal display watch as defined in claim 1, wherein said fluorescent substance layer contains said radioactive substance in only a region which corresponds to a time indicating portion.

3. A self-luminescent light source for a liquid crystal display watch as defined in claim 1, wherein said case is made of a metal.

4. A self-luminescent light source for a liquid crystal display watch as defined in claim 1, wherein said cover is made of a transparent high-polymer film.

5. A self-luminescent light source for a liquid crystal display watch as defined in claim 1, wherein said cover is made of glass.

6. A self-luminescent light source for a liquid crystal display which comprises in successive order a radiation absorbing casing a reflective layer containing fine grain powder of barium sulfate having a high reflection factor in a range from the near-ultraviolet to visible regions, a fluorescent substance layer, a self-luminescent type fluorescent material containing radioactive material disposed on a portion of said fluorescent substance layer, and a radiation absorbing protective cover layer.

7. A self-luminescent light source for a liquid crystal display as defined in claim 6, wherein said reflective layer comprises a fine grain powder of barium sulfate mixed with a polymeric binder.

8. A self-luminescent light source for a liquid crystal display as defined in claim 6, wherein said self-luminescent type material layer only covers that portion of the fluorescent substance material layer is to indicate an important function.

9. A self-luminescent light source for a liquid crystal display as defined in claim 1 or claim 6, wherein said radioactive material is in the solid state.

* * * * *